US007124051B2

(12) United States Patent
Patterson et al.

(10) Patent No.: US 7,124,051 B2
(45) Date of Patent: Oct. 17, 2006

(54) DATA LINK TESTER

(75) Inventors: Jack D. Patterson, Kalamazoo, MI (US); Matthew W. Starks, Burlington, MI (US); Steven L. Melvin, Scotts, MI (US); Kevin D. Snow, Augusta, MI (US); Roger Allen Graves, Jr., Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 83 days.

(21) Appl. No.: 10/767,812

(22) Filed: Jan. 29, 2004

(65) Prior Publication Data
US 2005/0171721 A1 Aug. 4, 2005

(51) Int. Cl.
*G06F 15/00* (2006.01)

(52) U.S. Cl. .................... 702/122; 702/183; 701/29; 379/1.04

(58) Field of Classification Search ............ 702/33–35, 702/57–58, 81–84, 113, 122, 182–185; 340/870.02, 340/870.03, 870.05, 870.06, 438–442, 453–455; 701/29–35; 379/1.03–1.04, 2
See application file for complete search history.

(56) References Cited

U.S. PATENT DOCUMENTS

| 6,295,492 B1 | 9/2001 | Lang et al. |
| 6,604,033 B1 | 8/2003 | Banet et al. |
| 6,611,740 B1 | 8/2003 | Lowrey |
| 6,636,790 B1 | 10/2003 | Lightner et al. |
| 2002/0027504 A1* | 3/2002 | Davis et al. ................ 340/540 |
| 2002/0173885 A1 | 11/2002 | Lawrey et al. |
| 2003/0040873 A1* | 2/2003 | Lesesky et al. .............. 702/57 |
| 2003/0088346 A1* | 5/2003 | Calkins ...................... 701/29 |
| 2003/0163249 A1* | 8/2003 | Kapolka .................... 701/123 |
| 2003/0171111 A1 | 9/2003 | Clark |
| 2005/0114080 A1* | 5/2005 | Baleta et al. ............... 702/182 |

OTHER PUBLICATIONS

AutoXray Users Manual downloaded from www.autoxray.com/dnload/EZLinkManual.pdf in Jan. 2004.

(Continued)

*Primary Examiner*—Marc S. Hoff
*Assistant Examiner*—Mary Catherine Baran
(74) *Attorney, Agent, or Firm*—Rader, Fishman & Grauer PLLC

(57) ABSTRACT

A data link tester comprises a computer capable of a connection with a communications bus in a piece of equipment having at least one component in selective contact with the bus. The computer contains instructions for (1) building a roster comprising at least one identifier of the component and (2) then performing a diagnostic step comprising at least one of (i) analyzing communications received from the communications bus to determine the condition of communications with respect to the component, (ii) determining whether a message that contains the identifier has been received from the communications bus within a specified period of time, and (iii) diagnosing at least one fault condition in CAN communications in the communications bus by performing at least one CAN message check comprising determining whether a CAN message has been received from the communications bus and then performing at least one second diagnostic step. In some embodiments, the piece of equipment is a vehicle.

44 Claims, 8 Drawing Sheets

OTHER PUBLICATIONS

SAE Surface Vehicle Recommended Practice J1587 (rev. proposed draft Oct. 2001).

SAE Surface Vehicle Recommended Practice J1939-71 (rev. Oct. 1998).

Vector Informatik BmbH CANalyzer/DENalyzer downloaded from www.informatik.de/english/products/canalyzer_1939_features.html on Jan. 29, 2004.

VTTI Toolbox OBDConnect User Guide, Copyright 2002.

Canalyzer Manual downloaded from www.vector-informatik.com/support/manuals/CANalyzerManual.pdf on Jan. 29, 2004.

* cited by examiner

DATA LINK TESTER

BACKGROUND OF THE INVENTION

This invention relates to the field of determining data communications conditions in a communications bus in a piece of equipment, such as a vehicle.

Prior to the present invention, service technicians have had at their disposal tools for analyzing data communications in a vehicle that provided very limited amounts of information. For example, the J1939/EPL Data link tester, designed by the assignee of the present application and sold by Nexiq Technologies of Sterling Heights, Mich., was only capable of provide information indicating whether a data link was functioning in response to a specific command.

Moreover, certain presently existing tools designed by engineers are capable of providing greater quantities of information, an example of such a tool being the Canalyzer software package sold by Vector Informatik GmbH of Stuttgart, Germany. However, such engineering tools are not designed for diagnostic use by service technicians. Engineering tools generally have complicated user interfaces and are unsuited to be easily usable by a service technician.

Further, engineering tools such as the Canalyzer are not designed to provide the functionality desired in a diagnostic tool. For example, prior art tools lack the functionality of specifically polling equipment components and reporting on information received as a result of the polling. Similarly, prior art tools lack the functionality of measuring the time it takes for a specific component to respond to a request, and reporting when the specific component fails to respond for a specified period of time. Also, the aforementioned engineering tools generally are not portable, a highly desirable feature in a diagnostic tool.

BRIEF SUMMARY OF THE INVENTION

The invention is a data link tester comprising a computer that in turn comprises a processor and a memory. The computer is capable of a connection with a communications bus in a piece of equipment. The piece of equipment comprises at least one component of interest in selective contact with the communications bus. The computer contains instructions stored in the memory and executable by the processor for (1) building a roster comprising at least one identifier of the component and (2) then performing a diagnostic step comprising at least one of (i) analyzing communications received from the communications bus to determine the condition of communications with respect to the component, (ii) determining whether a message that contains the identifier has been received from the communications bus within a specified period of time, and (iii) diagnosing at least one fault condition in CAN communications in the communications bus by performing at least one CAN message check comprising determining whether a CAN message has been received from the communications bus and then performing at least one second diagnostic step.

DETAILED DISCLOSURE

System Overview

Figure 1A:
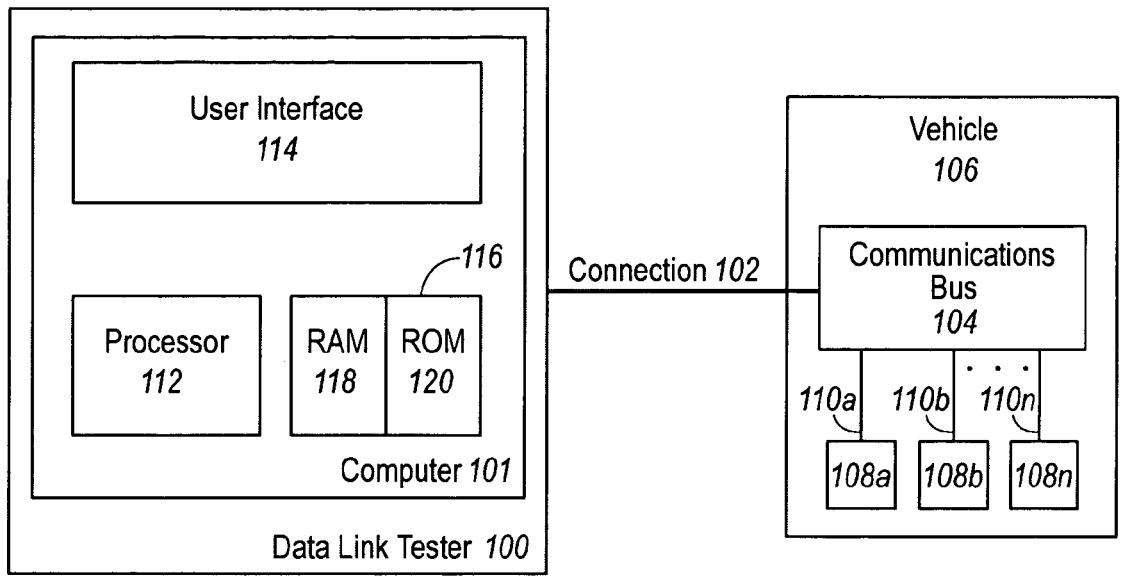
FIGS. 1A, 1B, 1C, and 1D present a general system overview with respect to four embodiments of the invention.

In one embodiment, data link tester 100 comprises computer 101, shown in FIG. 1A connected via connection 102 to communications bus 104 in vehicle 106. Computer 101 is capable of monitoring, testing, and analyzing communications occurring on communications bus 104 to and from vehicle 106 components 108$a$, 108$b$, ..., 108$n$ via data links 110$a$, 110$b$, ..., 110$n$ respectively. Connection 102 may be accomplished via a physical connector such as a cable, or by way of radio frequencies or other wireless mechanisms that are well known in the art. Although the invention is described herein with reference to vehicle 106, it should be understood that no subject matter disclosed herein limits the invention to communications in a vehicle and that the invention could be used to test communications in other kinds of equipment.

Computer 101 comprises a processor 112 for processing executable instructions. In most embodiments, computer 101 comprises a user interface 114, which is described in more detail below with reference to FIG. 2. In some embodiments computer 101 comprises a memory 116 that may comprise both RAM 118 (random-access memory) and ROM 120 (read-only memory). In some embodiments ROM 120 comprises the executable instructions and is connected to processor 112. The executable instructions may be compiled from computer program code written in the C, C++, or Java™ programming languages, or in some other programming language known to those skilled in the art. As noted above, communications bus 104 could be located in a kind of equipment other than a vehicle. In some embodiments, communications bus 104 is used for CAN (controller area network) communications, which are well known to those skilled in the art.

In some embodiments, computer 101 is a handheld computer. In one embodiment, computer 101 is the MD200 Scan tool manufactured by AutoXray, Inc. of Tempe, Ariz. In other embodiments computer 101 may be a personal computer, personal digital assistant (PDA), or Java-enabled device such as a mobile telephone; one skilled in the art will appreciate that computer 101 could be any computer capable of connecting to connection 102 and also capable of executing executable instructions for carrying out the processes described herein with reference to FIGS. 3–6.

Figure 1B:
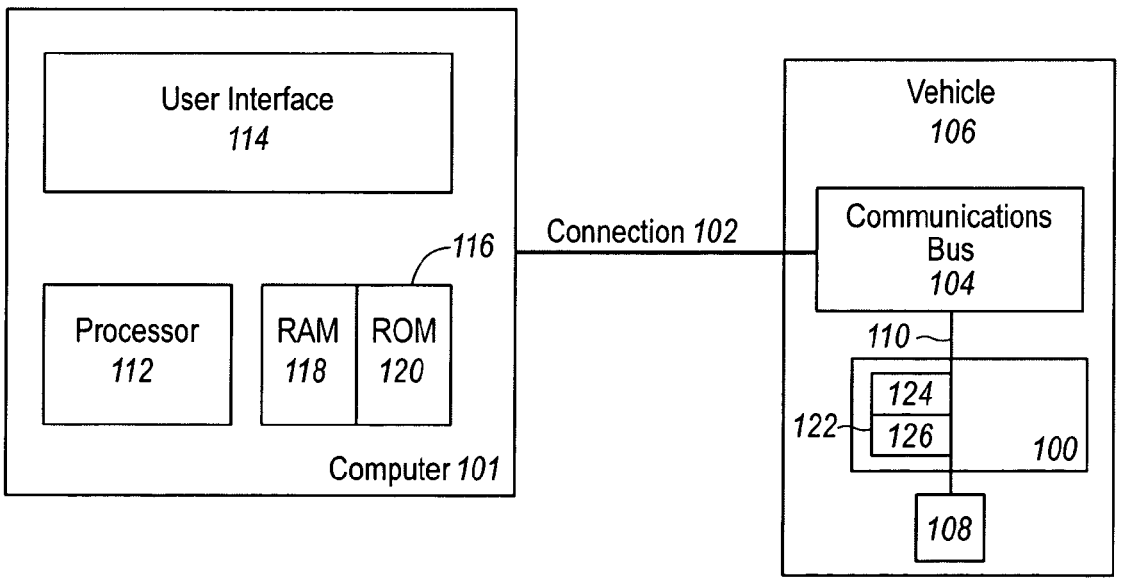

FIG. 1B depicts one alternative embodiment of the invention. In this embodiment, data link tester 100 comprises on-board computer 122, which in turn comprises processor 124 and memory 126. On-board computer 122 resides aboard vehicle 106. On-board computer 122 is integrated with data link 110, which also links component 108 to communications bus 104. In this embodiment, connection 102 connects computer 101 with on-board computer 122. Software instructions embodying the processing described herein with reference to FIGS. 3–6 are stored in on-board memory 126 and executed by on-board processor 124. On-board computer 122 provides output to, and receives input from, computer 101 via connection 102. In this embodiment, computer 101 is used to display output from on-board computer 122 such as menu options, function options, and/or information regarding fault conditions, all of which are described in more detail below. Computer 101 also in this embodiment provides input to on-board computer 122 comprising user menu and/or function selections. Those skilled in the art will recognize that in this embodiment and the embodiments described below with respect to FIG. 1C computer 101 provides essentially the functionality of a computer terminal for the data link tester 100 functionality provided in on-board computer 122. That is, with respect to FIGS. 1B, 1C, and 1D, computer 101 is used to display output and provide input, but does not enable other functionality described herein.

Figure 1C:
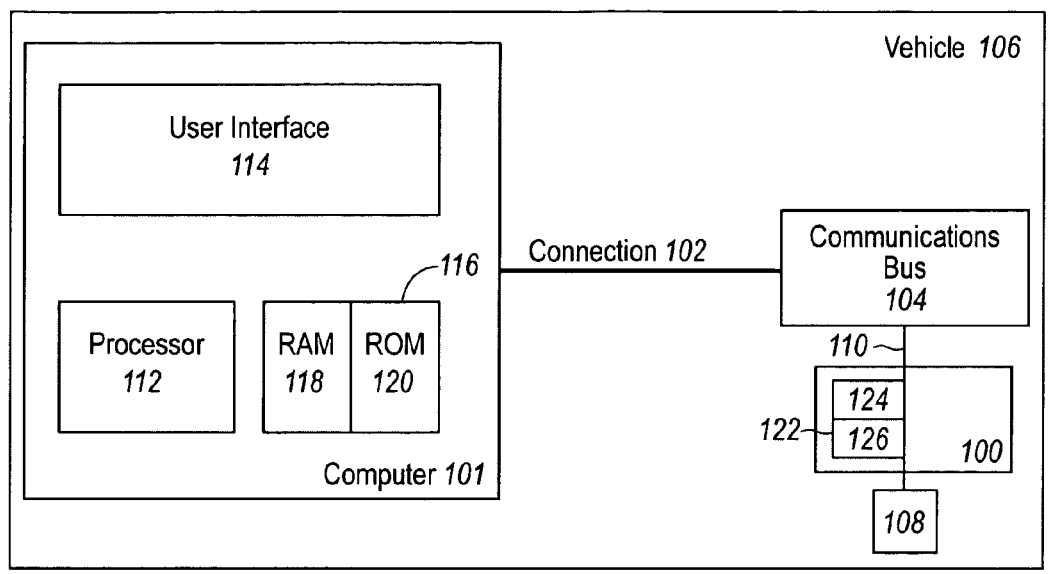

FIG. 1C depicts another alternative embodiment of the invention that is similar to the embodiment described above with reference to FIG. 1B. FIG. 1C depicts computer 101 on board vehicle 110, all other features of this embodiment being as they were described above with reference to FIG. 1B.

Figure 1D:
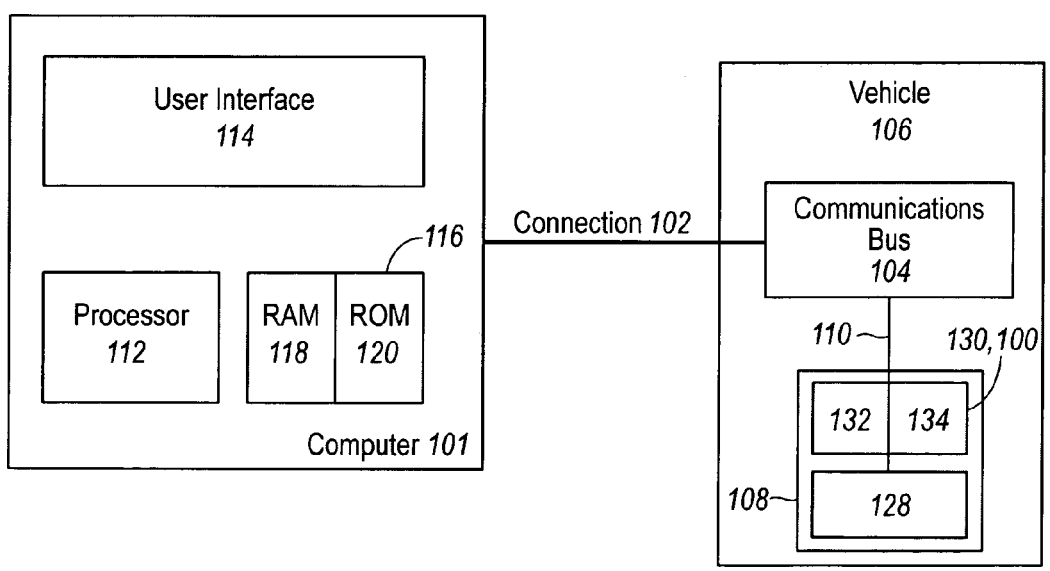

FIG. 1D depicts yet another alternative embodiment of the invention. This embodiment takes advantage of the fact that modem equipment, including vehicles, is generally manufactured to include computers including processors and memory that provide considerable computing power, often much more than is needed for the tasks for which such computers were designed. Accordingly, in this embodiment, data link tester 100 comprises component controller 130. Component controller 130 may be used to control any one of components 108a, 108b, . . . , 108n such as the transmission, engine, antilock brakes, electronic dashboard, etc. of vehicle 106. Those skilled in the art will recognize that component controller 130 is well known, and that various terms may be used to refer to component controller 130, including, among others, Engine Control Unit (ECU), Engine Control Module (ECM), Electronic Engine Controller (EEC), and/or Engine Control Computer (ECC). Component controller 130 comprises a component processor 132 and a component memory 134.

Component controller 130 sends and receives communications over communications bus 104 via data link 110. In this embodiment, connection 102 connects computer 101 with component controller 130. Software instructions embodying the processing described herein with reference to FIGS. 3–6 are stored in component memory 134 and executed by component processor 132. Component controller 130 provides output to, and receives input from, computer 101 via communications occurring over communications bus 104 and connection 102. Accordingly, as with other embodiments described herein, computer 101 in this embodiment is used to display output from component controller 130 such as menu options, function options, and/or information regarding fault conditions, all of which are described in more detail below. Computer 101 also in this embodiment provides input to component controller 130 comprising user menu and/or function selections. Those skilled in the art will also recognize that in this embodiment computer 100 provides essentially the functionality of a computer terminal for the data link tester 100 functionality provided in component controller 130.

In some embodiments data link tester 100 analyzes communications using a well known communications standard defined by the Society of Automotive Engineers (SAE), such as SAE J1939 for CAN-based communications or SAE J1587 for serial communications. In some embodiments the user has the option of determining which of several standards, possibly including SAE J1939 and SAE J1587, should be used. It should be understood that other communications standards, such as ISO9141 K or others known in the art, may be used in the present invention.

Figure 2:
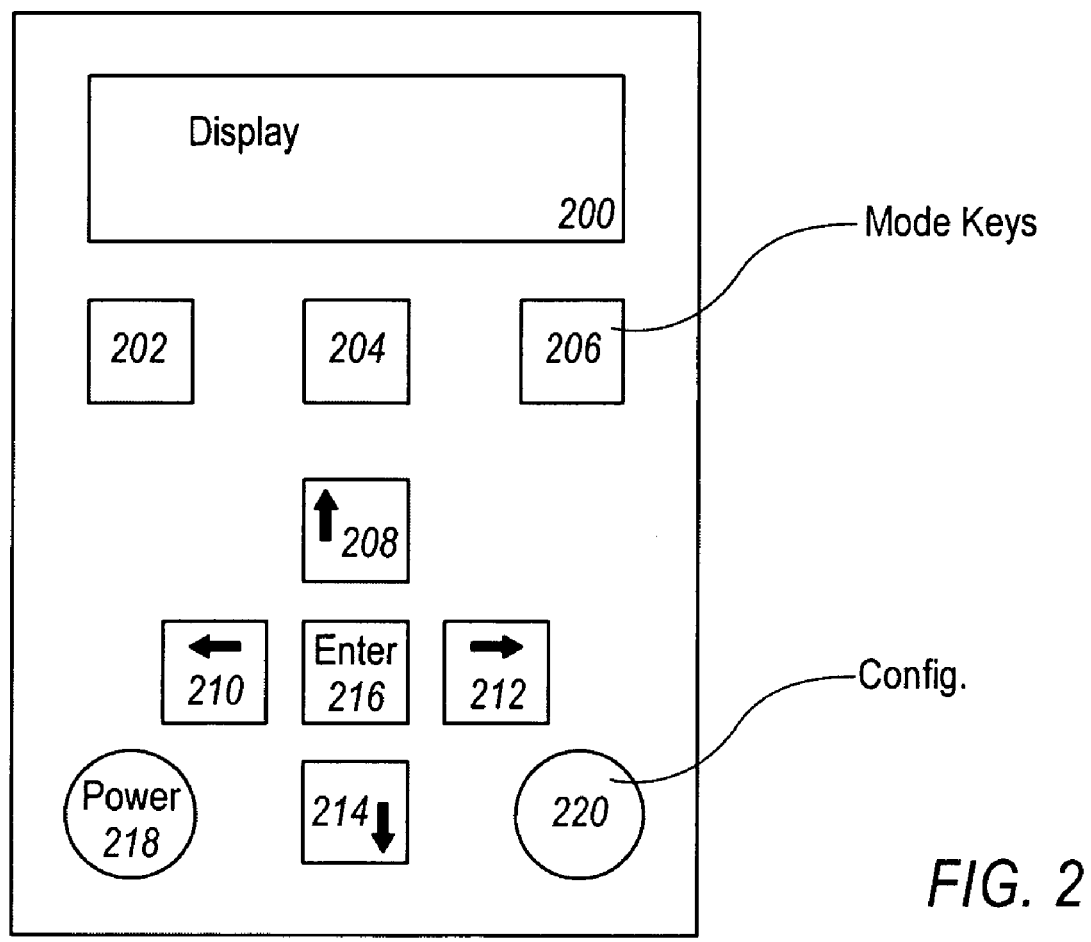
FIG. 2 presents a detailed view of the user interface used in one embodiment of the invention.

FIG. 2 depicts one embodiment of user interface 114 for computer 101. Display 200 may be any of those known in the art for use with computing devices, and presents output from processor 112 to a user or users of computer 101. Mode keys 202, 204, and 206 allow the user to select different modes of operation, described in detail below, for computer 101. The current implementation of the invention comprises mode keys 202, 204, and 206 respectively labeled as "Scan", "Mon", and "Data", and respectively enabling the selection of CAN fault monitor mode, communications monitor mode, and communications record mode, these three modes being described in detail below. One skilled in the art will recognize that there could be fewer or more mode keys than the three described here. Further, it should be understood that in some embodiments the functionality described herein with respect to mode keys 202, 204, and 206 as well as the below-described arrow keys 208, 210, 212, 214, enter key 216, power key 218, and config key 220 could variously be accomplished with other input devices. Such input devices might include a conventional computer keyboard, a mouse or other known pointing device, other special function buttons, or a stylus or pointing device used with a soft keyboard such as those commonly employed with handheld computers.

Arrow keys 208, 210, 212, and 214 allow the user to scroll up, left, right, and down respectively. It will be apparent to one skilled in the art that this disclosure in some places describes the simultaneous display of more data than will at one time fit on the display of at least some of the computing devices described above. In such cases, it should be understood that arrow keys or some other known means (such a pointing device coupled to scroll bars on a graphical user interface) may be used to scroll data up and down and right and left as needed. Further, one skilled in the art will recognize that arrow keys could at times be used to enable other functionality.

Enter key 216 can also be used to enable different functionalities at different times, including the selection of data, menu items, and the initiation of certain functionality as described below. Power key 218 is used to turn computer 101 on and off. Config key 220 is a special mode key that is used to select the configuration mode, described below, of computer 101.

One skilled in the art will recognize that in other embodiments different components could be used in place of those described with reference to FIG. 2. For example, display 200 could be the display of a scan tool, personal computer, mobile telephone or PDA, and keys 202, 204, 206, 208, 210, 212, 214, 216, and 220 could be keys on the keyboard of a personal computer, on the keypad of a mobile telephone or Java-enabled device, or virtual keys, i.e., soft keys, on the display of a PDA. Similarly, power key 218 could be a power switch or key on a scan tool, personal computer, mobile telephone, PDA, or java-enabled device.

Program Flow Overview

FIGS. 3–6 describe the program steps executed by data link tester 100. In present practice these program steps have been implemented using both the SAE J1939 and SAE J1587 standards. CAN fault monitor mode, described below, is not available when using the SAE J1587 standard. Otherwise, the functionality presented and the program flow employed is the same with respect to the SAE J1939 as well as the SAE J1587 standard, although a few minor differences are noted below. Moreover, the program flow and functionality disclosed herein could be used if some other communications standard, such as ISO 9141 K, were employed. Application programming interfaces for most known standards, including SAE J1939 and SAE J1587 are well documented, and well known. SAE Surface Vehicle Recommended Practice J1939-71 (rev. October 1998) and SAE Surface Vehicle Recommended Practice J1587 (rev. proposed draft October 2001) are each incorporated herein by reference.

It should be understood that when steps using processor 112 and memory 116 are described herein with reference to FIGS. 3–6 below that these steps could also be performed using on-board processor 124 and on-board memory 126 or component processor 132 and component processor 134. Similarly, when steps using on-board computer 122 or component controller 130 are described herein with reference to FIGS. 4–6 below, these steps could also be performed using computer 101.

Figure 3:
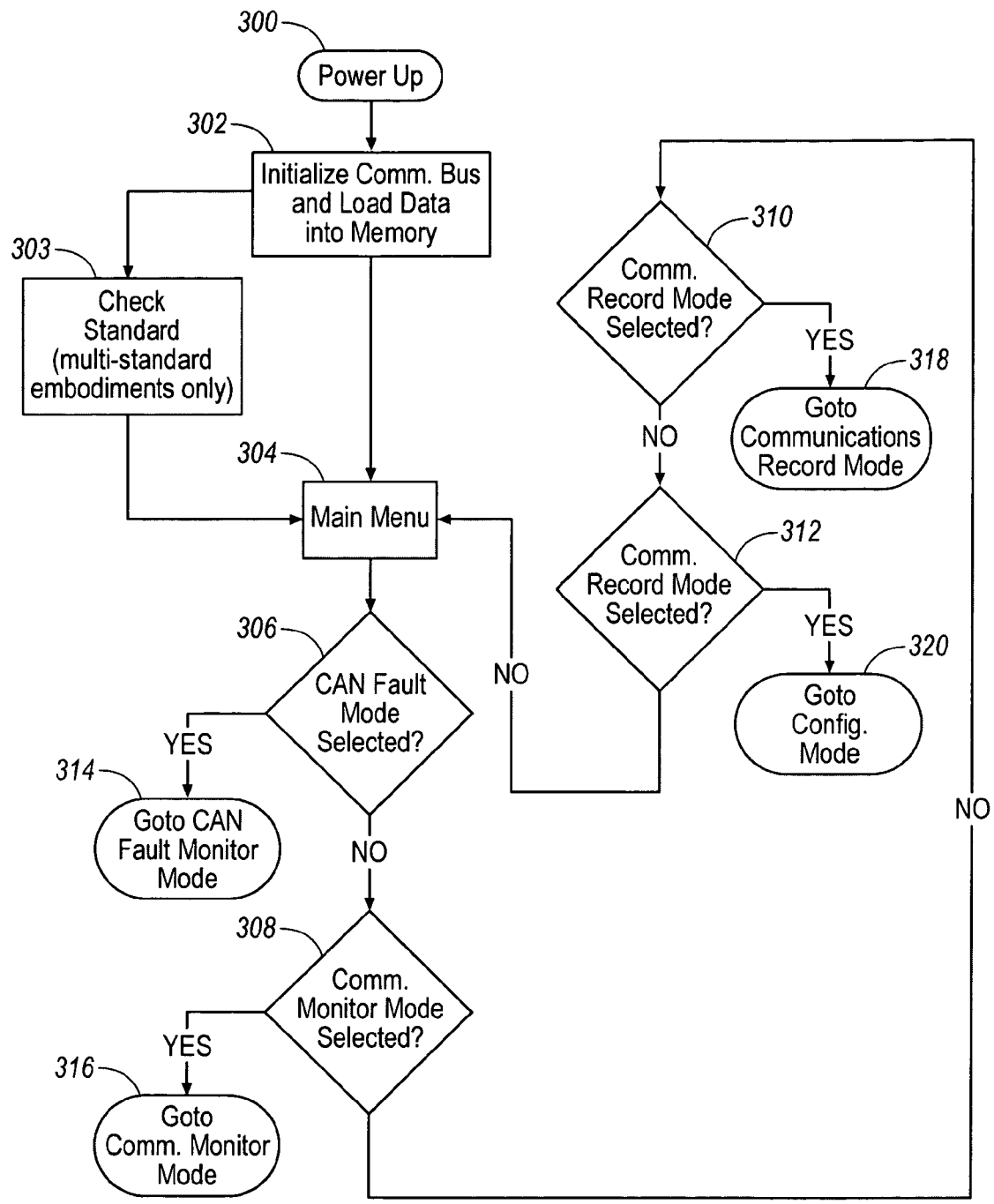
FIG. 3 describes the initial program flow of the invention.

When computer 101 is powered off, and power key 218 is pressed, the program flow depicted in FIG. 3 is initiated. Whenever, during the course of any program flow described herein, when computer 101 is powered on and power key 218 is pressed, program flow is interrupted and computer 101 is powered off.

In step 300, computer 101 is powered up. In step 302, communications bus 104 of vehicle 106 is initialized and tables of data with information about how to communicate with vehicle components 108a, 108b, . . . , 108n using each supported communications standard are loaded into RAM 118. For example, in embodiments supporting J1939, tables of data specified by the J1939 standard are loaded into RAM 118. The data specified by the J1939 standard includes J1939 parameter group number (PGN) and suspect parameter number (SPN) data. PGNs and SPNs are well known and are described in detail in the J1939-71 specification document referenced above. Briefly, a PGN is a unique number that identifies a CAN message. An SPN is a unique number that identifies a particular data field in a CAN message. Similarly, in embodiments supporting J1587, message identification data (MID) described in Table 1 beginning on page 3 of the J1587 specification referenced above is loaded into RAM 118. Briefly, the J1587 MID data comprises integer message identifiers (MIDs) ranging from zero to two-hundred and fifty-five, wherein each MID is associated with the description of one of vehicle components 108a, 108b, . . . , 108n. In one embodiment, arrays are used to store the tables of data in RAM 118, but one skilled in the art will recognize that other known data structures could be used. Also in step 302, a splash screen comprising a message such as "Establishing Communications—Please Wait" is output to display 200. Following step 302, control proceeds in some embodiments to step 303 and in others to step 304, as described below.

Step 303 is only necessary for embodiments that support more than one communications standard. In step 303 the user is presented with a list of supported standards on display 200 or otherwise prompted to select a standard from those available. The selected standard is then stored in memory 116, and control proceeds to step 304. Alternatively, computer 101 can automatically determine which communications standard to use by analyzing the communications being received over connection 102. Excepting the program flow described with respect to FIGS. 4A and 4B, which only applies to SAE J1939, it should be understood that before executing the program flow described below the invention determines which communications standard has been selected, and deploys executable instructions tailored to the selected standard as necessary, but that the steps described herein are essentially the same regardless of the standard employed.

In step 304, a main menu is output to display 200. In one embodiment, the main menu allows the user to select from four modes of operation: (1) CAN fault monitor mode; (2) communications monitor mode; (3) communications record mode; and (4) configuration mode. Of course, embodiments are possible in which the user is allowed to select from a subset of these four modes of operation. Indeed, as previously noted, CAN fault monitor mode is only available in embodiments using the SAE J1939 standard or some other standard that supports CAN communications. In current implementation, the invention also allows the user to use some or all of arrow keys 208, 210, 212, and 214 to move a cursor that highlights the desired option, which can then be selected by pressing enter key 216. Alternatively, the present implementation allows the user to select from among the four modes listed above using mode keys 202, 204, and 206, as well as config key 220. Moreover, the present implementation allows the user to use mode keys 202, 204, and 206, and config key 220 at any time during the execution of the program flow described below with reference to FIGS. 3–6 to select from the four modes listed above.

In step 306, it is determined whether the user has selected the CAN fault monitor mode. If yes, in certain embodiments in step 314 control proceeds to step 400 of FIG. 4A or step 450 of FIG. 4B. If no, control proceeds to step 308. In step 308, it is determined whether the user has selected communications monitor mode. If yes, in step 316 control proceeds to step 500 of FIG. 5. If no, control proceeds to step 310. In step 310, it is determined whether the user has selected communications record mode. If yes, in step 318 control proceeds to display the communications record mode menu. If no, control proceeds to step 312. In step 312, it is determined whether the user has selected configuration mode. If yes, in step 320 control proceeds to display configuration options. If no, control returns to step 304.

Can Fault Monitor Mode

As previously noted, CAN fault monitor mode is available only in embodiments that support CAN-based communications, such as those employing the SAE J1939 standard. In CAN fault monitor mode computer 101 detects faults in CAN communications on communications bus 104 during operation of vehicle 106. Such faults include corrupt data opens (i.e., a data link being open when it should not be or when no communications are occurring) and short circuits.

When the user selects CAN fault monitor mode from the main menu, display 200 shows either a "communications OK" screen indicating that no communications faults have been detected, or a "communications faults" screen that lists the communications faults that have been detected. In some embodiments, specific CAN fault conditions detected by computer 101 in CAN Fault Monitor Mode include all or some of the following: link shorted to voltage, link shorted to ground, link open, and CAN message errors. The next three paragraphs describe these conditions in more detail.

Link Shorted to Voltage or Ground—These conditions are determined by the CAN controller when the binary information received from component 108 of vehicle 106 is either all ones (link shorted to voltage) or all zeros (link shorted to ground). This fault will be displayed on display 200 if computer 101 detects this condition for a predetermined period of time. In some embodiments the specified period of time is twenty milliseconds, this amount of time having been found to be effective through use of the invention. In some embodiments display 200 will provide the message "LINK SHORTED TO VOLTAGE" on a first line with a second line showing the number times that this condition has occurred and the duration, in seconds, of the last occurrence.

Link Open—This condition is determined when no incoming messages are received on the link from any of components 108a, 108b, ..., 108n for a specified period of time. In some embodiments the specified period of time is two hundred milliseconds, this amount of time having been found to be effective through use of the invention. When this condition is detected, display 200 will in some embodiments provide the message "NO COMMUNICATIONS" on a first line with a second line showing the number times that this condition has occurred and the duration, in seconds, of the last occurrence.

CAN Message Errors—CAN data has several encoding schemes to verify the integrity of the data. These encoding schemes, well known in the art, are discussed in section 5.8 of the SAE J1939-21 specification, which is incorporated herein by reference. These schemes allow performing checks for error conditions that are well known to those skilled in the art, including Stuffing Errors, Form Errors, and Cyclic Redundancy Check (CRC) Errors. If any of these error conditions are detected continuously for a specified period of time a CAN message error is displayed on display 200. In some embodiments the specified period of time is two hundred milliseconds, this amount of time having been found to be effective through use of the invention. Generally the fault message reporting a CAN message error will state the nature of the error detected, e.g., "STUFFING ERROR".

Particularly in embodiments in which computer 101 is a handheld device, in CAN Fault Monitor Mode display 200 will provide a fault message on a first line with a second line showing the number of occurrences and duration of last occurrence. As described below, these numbers will be maintained and updated as appropriate until the mode is terminated. Processor 112 calculates the occurrence and duration numbers. Duration is generally displayed to the hundredth of a second. If more than one fault condition is detected multiple fault conditions may be listed in any order, but they are usually listed in the order that they occur.

Figure 4A:
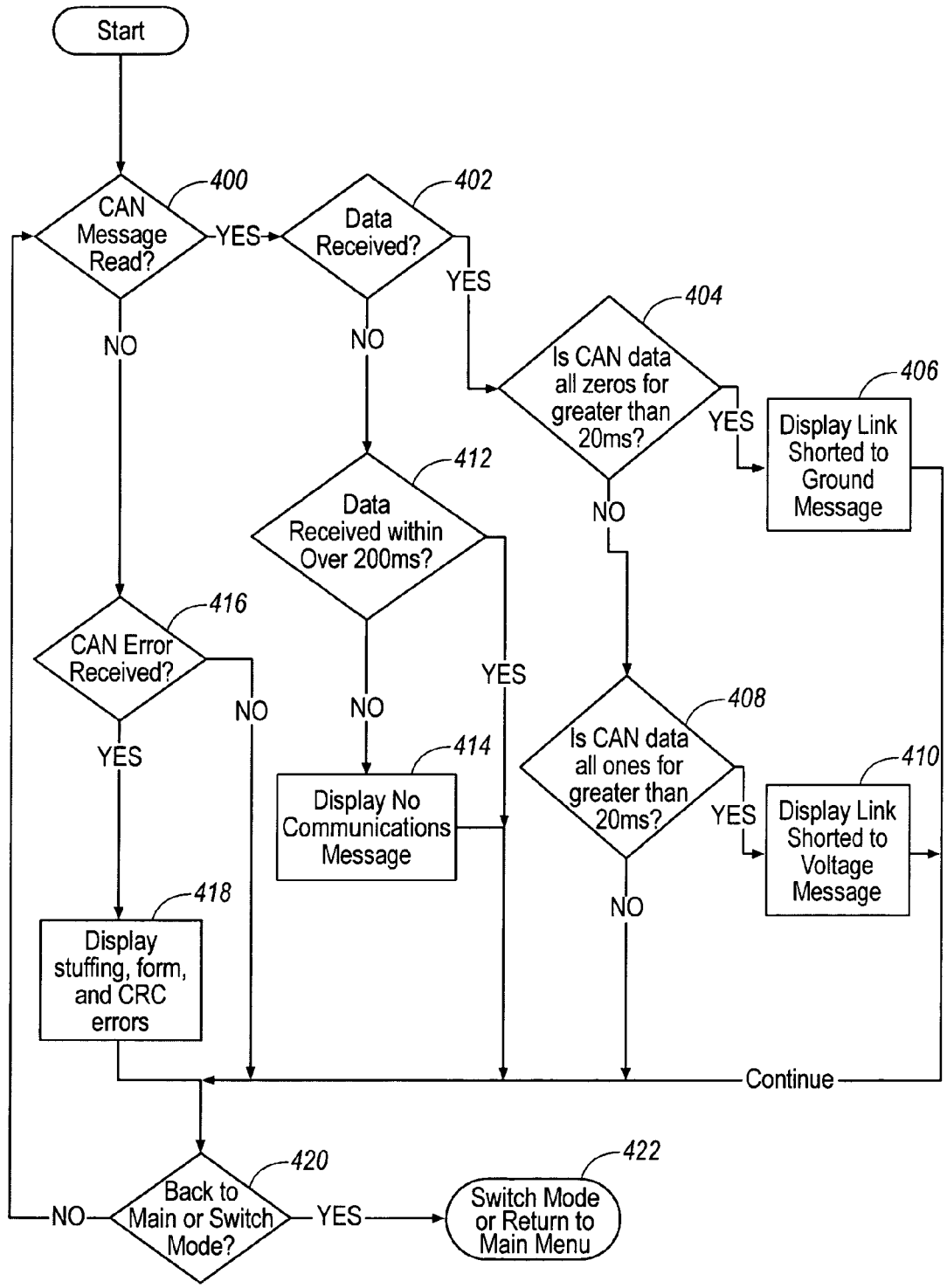
FIGS. 4A and 4B describe program flow with respect to CAN fault monitor mode in two embodiments of the invention.

FIG. 4A depicts execution of CAN fault monitor mode in one embodiment. Processing for CAN fault monitor mode begins with step 400. In some embodiments the user will enter CAN fault monitor mode by pressing a predetermined one of mode keys 202, 204, or 206, and/or by making the appropriate selection from the main menu by using arrow keys 208, 210, 212, and 214 to select the mode desired, and then pressing enter key 216.

In step 400 control immediately proceeds to step 416 if step 400 is being visited for the first time. Otherwise, the process determines whether a CAN message has been read since the last time step 400 was visited by determining whether computer 101 has received any communications at all from communications bus 104 since the last time step 400 was visited. If no, control proceeds to step 416. If yes, control proceeds to step 402.

In step 402, the process determines whether any data was received in the CAN message, that is, whether computer 101 has had a communication from any component 108a, 108b, ..., 108n since the last time step 402 was visited. If no, or if step 402 is being visited for the first time, control proceeds to step 412. If yes, control proceeds to step 404.

In step 404, the process determines whether the received CAN data is all zeros for a specified period of time. In some embodiments the specified period of time is twenty milliseconds, this amount of time having been found to be effective through use of the invention. If no, control proceeds to step 408. If yes, control proceeds to step 406. In step 406, a message is displayed to the user on display 200 indicating that a "link shorted to ground" error condition exists. In step 408, the process determines whether the received CAN data is all ones for a specified period of time. In some embodiments the specified period of time is twenty milliseconds, this amount of time having been found to be effective through use of the invention. If no, control proceeds to step 420. If yes, control proceeds to step 410. In step 410, a message is displayed to the user on display 200 indicating that a "link shorted to voltage" error condition exists. It should be noted that, while a stream of all ones or all zeros does not guarantee that one of the described link shorted error conditions exists, tests of the present invention have shown that when a stream of all ones or all zeros is detected, it is highly likely that one of the respective link shorted error conditions described above exists.

In step 412, after the process has determined in step 402 that no data was received in the CAN message or messages read in the last execution of step 402, the process determines whether or not data has been received within a specified period of time. In some embodiments the specified period of time is two hundred milliseconds, this amount of time having been found to be effective through use of the invention. If the process determines in step 412 that data has been received within the specified period of time, control proceeds to step 420. If data has not been received within the specified period of time, control proceeds to step 414. In step 414, a message is displayed to the user on display 200 indicating that a link open error condition exists. Present practice is for the message displayed in step 414 to state "NO COMMUNICATIONS". Control then proceeds to step 420.

In step 416, after the process has determined in step 400 that step 400 has only been visited once or that a CAN message has not been read since the last execution of step 400, the process determines whether a CAN error has been received according to the encoding schemes referenced above. If no, control proceeds to step 420. If yes, control proceeds to step 418. In step 418, a message is displayed to the user on display 200 indicating that a data error condition exists. In some embodiments, the message will state that the data error condition is one of a data stuffing, data form, or CRC error, all of which are well known, as described above. Control then proceeds to step 420.

In step 420, the process determines whether any user input has been received requesting a return to the main menu or a change to any other mode. If no, control returns to step 400. If yes, control proceeds to step 422, which returns control either to step 304 depicted in FIG. 3 or to the beginning of the program flow for the selected mode, as appropriate.

Figure 4B:
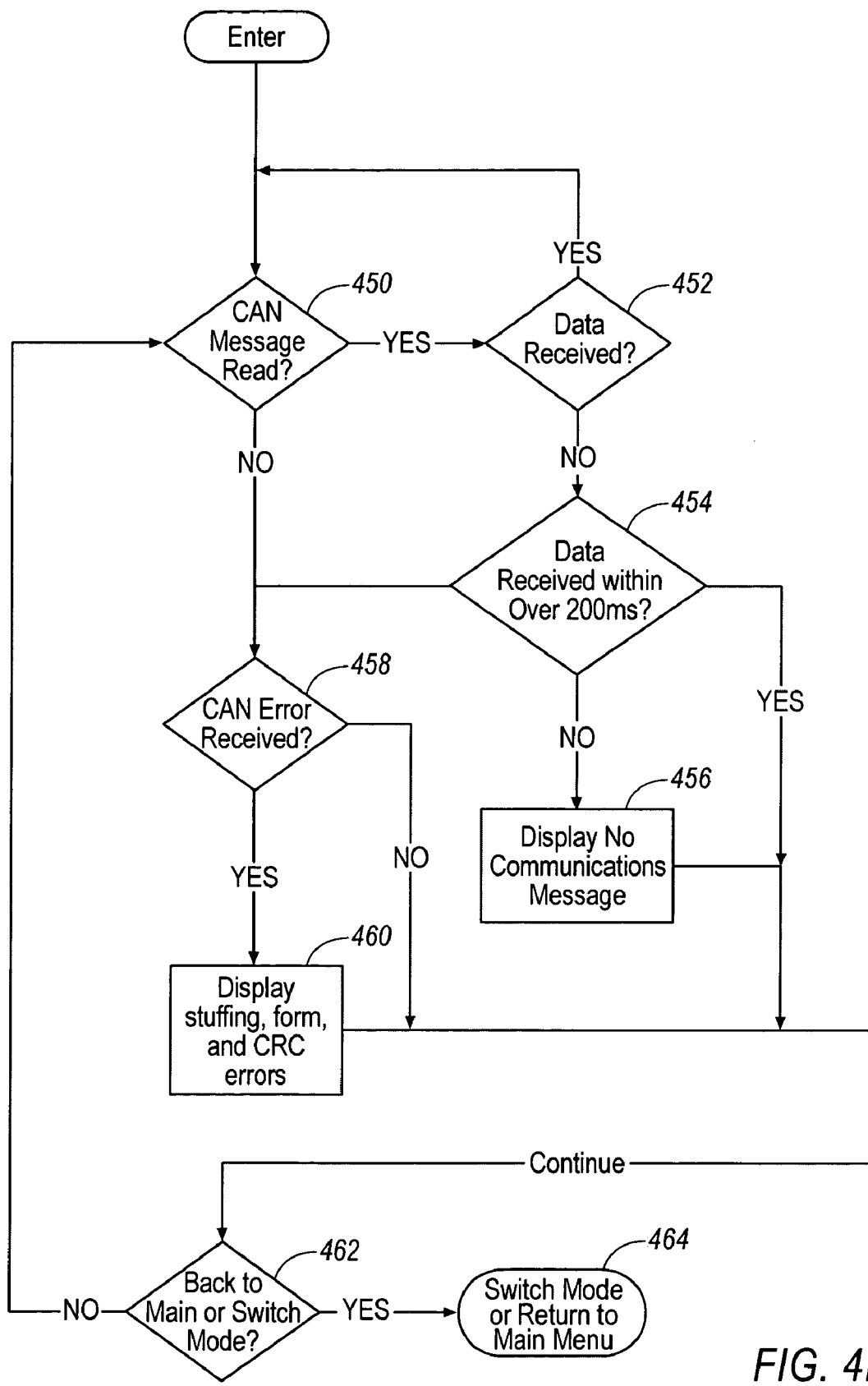

FIG. 4B describes an alternative embodiment in which computer 101 in CAN fault monitor mode is capable of analyzing a subset of the fault conditions described above with reference to FIG. 4A, specifically link open errors and CAN errors. Thus, the process described in FIG. 4B comprises steps that are similar and in some cases identical to a subset of the steps described above with reference to FIG. 4A.

In step 450 control immediately proceeds to step 458 if step 450 is being visited for the first time. Otherwise, the process determines whether a CAN message has been read since the last time step 450 was visited by determining whether computer 101 has received any communications at all from communications bus 104 since the last time step 450 was visited. If no, control proceeds to step 458. If yes, control proceeds to step 452.

In step 452, the process determines whether any data was received in the CAN message, that is, whether computer 101 has had a communication from any of components 108a, 108b, ..., 108n in vehicle 106 since the last time step 452 was visited. If no, or if step 452 is being visited for the first time, control proceeds to step 454. If yes, control returns to step 450.

In step 454, after the process has determined in step 452 that no data was received in the CAN message or messages read in the last execution of step 452, the process determines whether or not data has been received within a specified period of time. In some embodiments the specified period of time is two hundred milliseconds, this amount of time having been found to be effective through use of the invention. If the process determines in step 454 that data has been received within the specified period of time, control proceeds to step 462. If data has not been received within the specified period of time, control proceeds to step 456. In step 456, a message is displayed to the user on display 200 indicating that a link open error condition exists. Present practice is for the message displayed in step 456 to state "NO COMMUNICATIONS". Control then proceeds to step 462.

In step 458, after the process has determined in step 450 that step 450 has only been visited once or that a CAN message has not been read since the last execution of step 450, the process determines whether a CAN error has been received. If no, control proceeds to step 462. If yes, control proceeds to step 460. In step 460, a message is displayed to the user on display 200 indicating that a data error condition exists. In some embodiments, the message will state that the data error condition is one of a data stuffing, data form, or CRC error, all of which are well known, as described above. Control then proceeds to step 462.

In step 462, the process determines whether any user input has been received requesting a return to the main menu or a change to any other mode. If no, control returns to step 450. If yes, control proceeds either to step 464, which returns control either to step 304 as depicted in FIG. 3 or to the beginning of the program flow for the selected mode, as appropriate.

Communications Monitor Mode

Communications monitor mode is used to monitor communications and provide information on which components 108a, 108b, ..., 108n are communicating on communication bus 104. This mode can be made available to monitor communications bus 104 using a variety of communications standards. In particular, communications monitor mode can be implemented regardless of whether or not the data link in a given embodiment of the invention supports CAN-based communications. Generally, although not necessarily, communications monitor mode is available in embodiments using either of the J1939 or J1587 standards.

Communications monitor mode comprises three functions, some or all of which may be present in any given embodiment: (1) a roster function, which provides a list of components 108a, 108b, ..., 108n communicating on communications bus 104, (2) a communication loss function, which tracks components 108a, 108b, ..., 108n that cease communicating for a period of time, and (3) a communication time monitoring function, which provides an average duration of messages that are received from a specific component 108.

Figure 5:
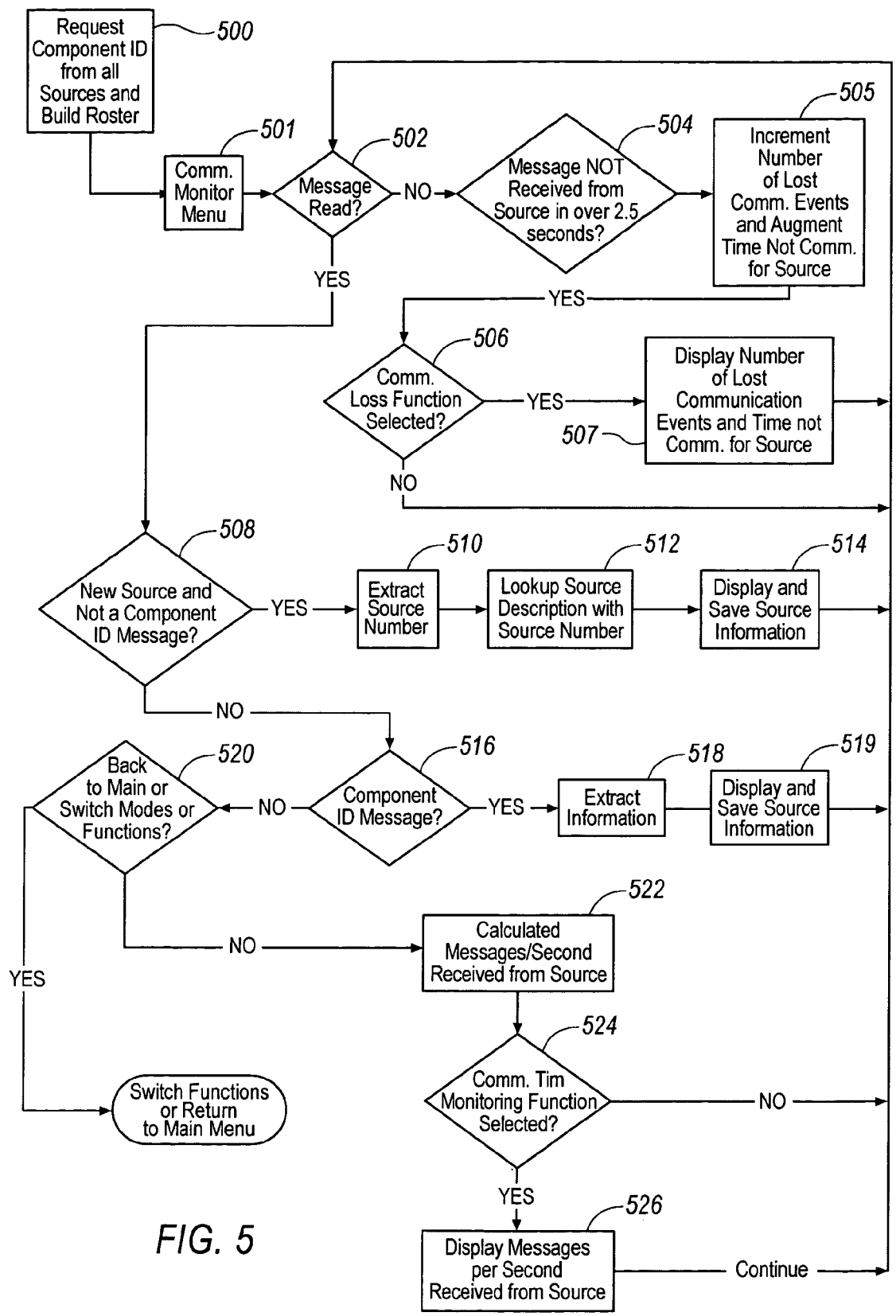
FIG. 5 describes program flow with respect to communications monitor mode.

FIG. 5 depicts execution of communications monitor mode in one embodiment. Processing for communications monitor mode begins with step 500. In some embodiments the user will enter communications monitor mode by pressing a predetermined one of mode keys 202, 204, or 206, and/or by making the appropriate selection from the main menu by using arrow keys 208, 210, 212, and 214 to select the mode desired, and then pressing enter key 216.

One novel aspect of the invention is that the roster function builds the roster of components 108a, 108b, ..., 108n communicating on communications bus 104 in two ways. First, the roster function requests component IDs as described below with respect to step 500. Second, the roster function adds to the list by continuously or nearly continuously monitoring the communications link for any new component 108 during the time in which the roster function is selected. This real-time or near real-time data link monitoring function is described below with respect to the steps beginning at step 502.

At step 500, the process requests component IDs (i.e., numbers uniquely identifying each component 108 in the vehicle that is communicating on the data link) for all sources, i.e., components 108a, 108b, ..., 108n, communicating on communications bus 104. Also in step 500, using the data loaded into memory 116 in step 302 of FIG. 3, the process looks up the component description that is associated with each component ID, and stores in memory 116 a list of all returned component IDs and their associated descriptions. Also stored in memory associated with each component ID are variables for storing the following data with respect to each component 108: number of lost communication events, time not communicating, messages received per second, and number of bad messages. These variables, explained below, are all initialized to a value of zero. While the processing of step 500 is occurring, a message telling the user to please wait while the roster is determined may be displayed on display 200, e.g., "PLEASE WAIT."

Once the roster is stored in memory as described with reference to step 500, processing proceeds to step 501, in which the communications monitor menu is displayed on display 200. The communications monitor menu gives the user the option to select the roster function, the communication loss function, or the communication duration monitoring function. In some embodiments functions may be selected from this menu using mode keys 202, 204, and 206 and/or arrow keys 208, 210, 212, and 214, along with enter key 216 and a cursor that highlights options on display 200 for the user to select by pressing enter key 216.

When the roster function is selected, component descriptions of all components 108a, 108b, ..., 108n that have been identified as communicating on communications bus 104 (through either of the two procedures for building a roster mentioned above) are displayed in display 200. By using arrow keys 208, 210, 212, and 214 the user may move a cursor to highlight one listed component 108 at a time. When a listed component 108 is selected (by, for example, pressing enter key 216 when a component is highlighted), display 200 will display additional information about component 108. In some embodiments this information comprises at least one of make, model, and serial number of component 108. The additional information that may be displayed concerning component 108 is determined as described below with respect to steps 516 and 518.

When the communication loss function is selected, display 200 displays descriptions of all components 108a, 108b, ..., 108n for which communication losses have been detected, along with the values for the number of lost communication events and time not communicating variables for each component 108 for which a communication loss has been detected, as described below with reference to steps 502–507. In some embodiments, the description of component 108 is displayed on a first line and the values of the number of lost communication events and time not communicating variables are displayed on a second line immediately beneath the first line. The values of the number of lost communication events and time not communicating variables may or may not be displayed with descriptive labels stating what the values represent.

When the communication time monitoring function is selected, the description of each component 108 listed in the roster is displayed along with the values of the messages received per second and number of bad messages variables (which values are calculated in steps 522–526 below) associated with each component 108.

Once step 501 is complete and the communications monitor menu has been displayed, the processing described below with respect to steps 502–526 proceeds regardless of whether the user has made a selection from the communications monitor menu. Further, it should be understood that the processing described below with respect to steps 502–526 continues regardless of what function has been selected (or even if no function has been yet selected) from the communications monitor menu; such processing ceases only if the user chooses to return to the main menu as described below with reference to step 520 or if the user powers off computer 101. In some embodiments, once the user has selected a function from the communications monitor menu, mode keys 202, 204, and 206 may be used to select other modes and/or the main menu. In other embodiments, enter key 216 is used to return to the main menu, while mode keys 202, 204, and 206 are used to toggle between communications monitor mode functions.

Once the communications monitor menu has been displayed as described above with reference to step 501, processing begins as described with reference to step 502. In step 502, the process determines whether a message from communications bus 104 has been read since the last time the process visited step 502. If yes, control proceeds to step 508. If no, or if this is the first time the process has visited step 502, control proceeds to step 504.

In step 504, the process determines whether a message has NOT been received from any source, i.e., component 108 listed in the roster, for a specified period of time, ranging from four hundred milliseconds to two and one-half seconds in various embodiments. In some embodiments the specified period of time varies depending on which of components 108a, 108b, . . . , 108n is being tested. With respect to most kinds of components 108a, 108b, . . . , 108n, it has been determined that the invention is effective in step 504 when two and one-half seconds is the specified period of time.

In step 505, the process increments by one the number of lost communication events variable associated with each component 108 identified in step 504. Also, for each component 108 identified in step 504, the process in step 505 augments the time not communicating variable, i.e., adds to its value the difference in seconds between the present time and the time when the last message was received from the source.

In step 506, the process determines whether the communication loss function has been selected. If no, control returns to step 502. If yes, control proceeds to step 507.

In step 507, the process causes the values for the number of lost communications events and time not communicating values to be displayed on display 200; in some embodiments these values are displayed with descriptive labels indicating what they represent. Control then returns to step 502.

Control proceeds to step 508 when the process determines in step 502 that at least one new message from communications bus 104 has been read since the last time step 502 was visited. In step 508, the process determines whether the new message or messages identify at least one new component 108 by determining whether the message or messages contain at least one component ID that is not currently listed in the roster. If no, control proceeds to step 516. If yes, control proceeds to step 510.

In step 510, all component IDs in the new message or messages are extracted from the new message or messages. In step 512, using the data loaded into memory 116 in step 302 described above with reference to FIG. 3, the process uses the component ID of each newly found component 108 to find the component description of each new component. Control then proceeds to step 514, in which each newly found component ID and component description is added to the roster (usually by appending the component to the end of the roster) along with the variables, initially set to zero, described above with reference to step 500. Also in step 514, if the roster function is currently selected, the display 200 is updated to include the components newly added to the roster. Following step 514, control proceeds to step 502.

Control proceeds to step 516 when the process determines in step 508 that the new message or messages do not contain a new component ID. In step 516, the process determines whether the new message or messages includes a response to a request for information about a component 108, requested by a user when the roster is being displayed as described above with respect to step 501. In embodiments using the SAE J1939 standard, this information is requested using a Global ID request. In embodiments using the SAE J1587 standard, this information is requested using a PID 243 request. If the determination of step 516 is no, processing proceeds to step 520. If yes, processing proceeds to step 518.

In step 518, the process extracts the information requested by the user from the new message or messages. As noted above, this information generally comprises a make, model, and serial number of component 108.

From step 518, control proceeds to step 519. In step 519 any information newly received in step 518 is saved and the display is updated as necessary. Generally, this means that the information about a given component 108 requested by the user will be displayed, and this information will be made part of the roster by saving it to memory associated with the component ID to which it pertains.

In step 520, the process checks to determine whether the user has requested a return to the main menu, a different mode, or a different function within communications monitor mode. If yes, control exits communications monitor mode or the currently selected function as appropriate and returns to the main menu or switches to a new mode or function according to the user's request. If no, control proceeds to step 522.

In step 522, the process calculates, for each component 108a, 108b, . . . , 108n, the number of messages received per second from each component 108a, 108b, . . . , 108n. For each "bad" message from a component 108, i.e., message not containing meaningful data, the process augments the number of bad messages variable by one. Control then proceeds to step 524, in which the process determines whether the communication time monitoring function has been selected. If no, control returns to step 502. If yes, control proceeds to step 526. In step 526, the roster is displayed on display 200, wherein proximate to each component ID (next to or below in some embodiments) is displayed the value for messages per second for the component 108. Control then returns to step 502.

Communications Record Mode

Communications record mode records communications that are occurring on communications bus 104. In addition to recording, this mode allows viewing and exporting communications messages received from communications bus 104. Communications record mode can be made available to monitor communications bus 104 using a variety of communications standards. In particular, communications record mode can be implemented regardless of whether or not the data link in a given embodiment of the invention supports CAN-based communications.

In some embodiments the user will enter communications record mode by pressing a predetermined one of mode keys 202, 204, or 206, and/or by making the appropriate selection from the main menu by using arrow keys 208, 210, 212, and 214 to select the mode desired, and then pressing enter key 216. Upon entering communications record mode the user will be provided with the record mode menu, which will provide options to record, view, and export data.

Communications record mode generally provides three functions: (1) a communications record function, (2) a view recorded communications function, and (3) an upload communications function. In some embodiments functions may be selected from this menu using mode keys 202, 204, and 206 and/or arrow keys 208, 210, 212, and 214, along with enter key 216 and a cursor that highlights options on display 200 for the user to select.

Figures 6A, 6B, 6C:
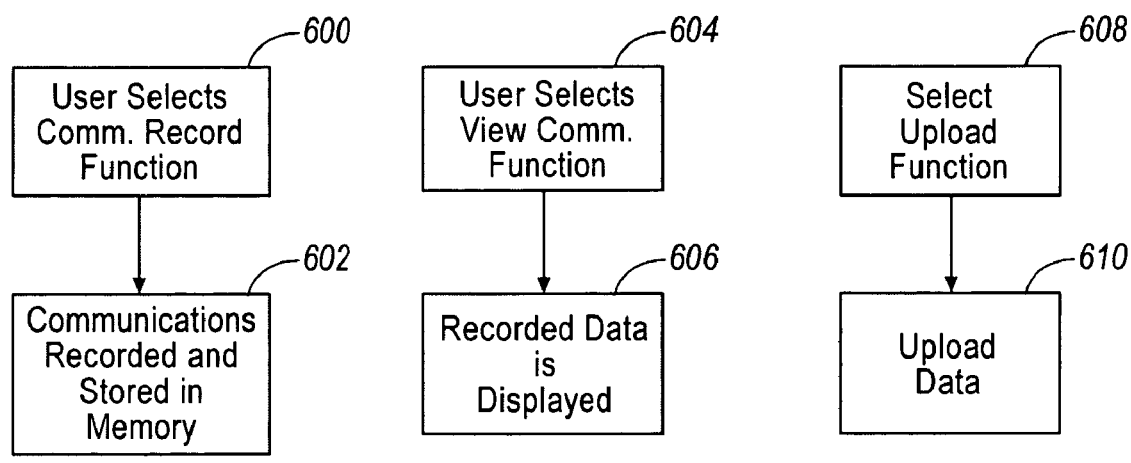
FIGS. 6A, 6B, and 6C describe program flow with respect to communications record mode.

With reference to FIG. 6A, when the user selects the communications record function in step 600, all communications that occur on communications bus 104 within a specified period of time are recorded and stored in memory 116 for playback in step 602. In present embodiments, what is recorded is the raw (i.e., binary) serial data stream from communications bus 104. In some embodiments, the specified period of time is two minutes. Those skilled in the art will recognize that this period might be longer or shorter depending on the amount of memory 116 available in computer 101, as well as the amount of data needed for a particular purpose.

With reference to FIG. 6B, when the user selects the view recorded communications function in step 604, all data received from communications bus 104 of vehicle 106 is displayed to the user in step 606. In some embodiments each byte of the raw serial (i.e., binary) data for each recorded message received from communications bus 104 is displayed on display 200. In some embodiments, each byte is displayed in decimal format and is separated from adjacent bytes by a space, and each message is separated by a blank line. Methods for converting data from binary to decimal format are well known in the art, as are methods by which spaces and lines can be inserted between bytes and messages, respectively. Generally, messages are displayed in the order they are received (i.e., first in, first out).

With reference to FIG. 6C, when the user selects the upload communications function in step 608, communications recorded and stored in memory 116 using the communications record function are uploaded to a second computer from computer 101 in step 610. For example, in some embodiments, computer 101 is one of the handheld or portable devices described above, and the second computer is a laptop or desktop personal computer using some version of the Windows® operating system from Microsoft® Corporation of Redmond, Wash. In present practice, the second computer comprises a port that supports the RS-232 standard for data communications; the RS-232 standard is well known in the art. Computer 101 is then connected via connection 102 to the second computer's RS-232 port. In this embodiment, if the second computer lacks an RS-232 port but has a USB (Universal Serial Bus) port, one skilled in the art will recognize that a USB-to-RS-232 adapter may be used. Data is generally uploaded to the second computer using the same format described above with respect to the view recorded communications function.

Configuration Mode

In embodiments where it is present, the configuration mode is generally invoked when the user selects configuration mode from the main menu, and/or when the user presses config key 220. Current practice is for the configuration mode to allow the user to select between communications standards to be used. In the current implementation, the available standards, SAE J1939 or SAE J1587, are listed on display 200, and the user can move a cursor using arrow keys 208, 210, 212, and/or 214 to highlight the desired standard, which can then be selected by pressing enter key 214.

It should be understood that configuration mode might be used to allow the user to configure a number of different parameters of the present invention. For example, the user could be given the option of setting the periods of time used by the system to determine CAN faults as described above with reference to steps 404, 408, and 412 depicted in FIG. 4A. Similarly, config mode could be used to allow the user to customize the period of time for which a component must not send a message over communications bus 104 before a lost communication event is displayed and/or recorded as described above with reference to steps 504–506 of FIG. 5. Further, the user could be given the ability to select the kinds of errors or faults to be reported, or the specific components with respect to which the user would like errors or faults reported.

CONCLUSION

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of determining the conditions of communications in the communications bus of a piece of equipment and that the disclosed apparatus, systems and methods will be incorporated into such future embodiments. Accordingly, it will be understood that the invention is capable of modification and variation and is limited only by the following claims.

We claim:

1. A data link tester comprising:
(a) a computer comprising a processor and a memory, wherein the computer is capable of a connection with a communications bus in a piece of equipment and further wherein the piece of equipment comprises at least one component of interest in selective contact with the communications bus; and
(b) instructions stored in the memory and executable by the processor for (1) building a roster comprising at least one identifier of the component and (2) then performing a diagnostic step comprising analyzing communications received from the communications bus to determine the condition of communications with respect to the component;

wherein the diagnostic step further comprises determining a number of messages received per second relating to the identifier.

2. The data link tester of claim 1, further comprising a user interface.

3. The data link tester of claim 1, wherein the computer is a component controller.

4. The data link tester of claim 1, wherein the identifier is associated with at least one of a component description, a number of lost communication events, a time not communicating, a number of messages received per second, a number of bad messages, a component make, a component model and a component serial number.

5. The data link tester of claim 1, wherein the diagnostic step further comprises determining whether there has been a lost communications event relating to the identifier.

6. The data link tester of claim 1, wherein the diagnostic step further comprises determining a time not communicating relating to the identifier.

7. The data link tester of claim 1, wherein the diagnostic step further comprises determining a number of bad messages relating to the identifier.

8. The data link tester of claim 1, wherein the diagnostic step further comprises determining that the communications received from the communications bus contain at least one second identifier of at least one second component in the piece of equipment, wherein the second identifier is not in the roster.

9. The data link tester of claim 8, wherein the instructions stored in the memory are further executable by the processor for adding the second identifier to the roster.

10. The data link tester of claim 1, wherein the diagnostic step further comprises extracting from the communications received from the communications bus information related to the identifier.

11. The data link tester of claim 1, wherein the computer communicates with the communications bus according to the SAE J1587 standard.

12. The data link tester of claim 1, wherein the computer communicates with the communications bus according to the SAE J1939 standard.

13. The data link tester of claim 1, wherein the piece of equipment is a vehicle.

14. The data link tester of claim 1, wherein the computer is on board the piece of equipment.

15. The data link tester of claim 1, further comprising a second computer capable of receiving data that the computer causes to be uploaded from the memory.

16. The data link tester of claim 1, wherein the connection comprises a cable that supports the RS-232 data communications standard.

17. A data link tester comprising:
(a) a computer comprising a processor and a memory, wherein the computer is capable of a connection with a communications bus in a piece of equipment and further wherein the piece of equipment comprises at least one component of interest in selective contact with the communications bus; and
(b) instructions stored in the memory and executable by the processor for (1) building a roster comprising at least one identifier of the component and (2) then performing a diagnostic step comprising determining whether a message that contains the identifier has been received from the communications bus within a specified period of time;

wherein the diagnostic step further comprises determining a number of messages received per second relating to the identifier.

18. The data link tester of claim 17, wherein the specified period of time is in a range from approximately 400 milliseconds to approximately 2.5 seconds.

19. The data link tester of claim 17, further comprising a user interface.

20. The data link tester of claim 17, wherein the computer is a component controller.

21. The data link tester of claim 17, wherein the processor communicates with the communications bus according to the SAE J1587 standard.

22. The data link tester of claim 17, wherein the processor communicates with the communications bus according to the SAE J1939 standard.

23. The data link tester of claim 17, further comprising a second computer capable of receiving data that the computer causes to be uploaded from the memory.

24. The data link tester of claim 17, wherein the equipment comprises a vehicle.

25. The data link tester of claim 17, wherein the computer is on board the piece of equipment.

26. The data link tester of claim 17, wherein the connection comprises a cable tat supports the RS-232 data communications standard.

27. A data link tester comprising:
(a) a computer comprising a processor and a memory, wherein the computer is capable of a connection with a communications bus in a piece of equipment and further wherein the piece of equipment comprises at least one component of interest in selective contact with the communications bus; and
(b) instructions stored in the memory and executable by the processor for diagnosing at least one fault condition in CAN communications in the communications bus by performing at least one CAN message check comprising determining whether a CAN message has been received from the communications bus and then performing at least one diagnostic step;

wherein the diagnostic step further comprises determining a number of messages received per second relating to an identifier.

28. The data link tester of claim 27, wherein the at least one CAN message check is performed a plurality of times and the diagnostic step comprises determining whether a specified time exceeds an elapsed period of time between performance of a first CAN message check in which a CAN message was detected containing data and a second CAN message check in which a CAN message was detected not containing data.

29. The data link tester of claim 28, wherein the diagnostic step comprises determining whether a link open condition exists.

30. The data link tester of claim 27, wherein the at least one CAN message check is performed a plurality of times and the diagnostic step comprises determining whether a specified period of time exceeds an elapsed period of time between performance of a first CAN message check in which a CAN message was detected containing data and a second CAN message check in which a CAN message was detected containing data.

31. The data link tester of claim 30, wherein the diagnostic step comprises determining whether a link shorted condition exists by determining whether the communications bus has been sending only ones for the specified period of time.

32. The data link tester of claim 30, wherein the diagnostic step comprises determining whether a link shorted condition exists by determining whether the communications bus has been sending only zeros for the specified period of time.

33. The data link tester of claim 27, wherein, if it has been determined in the CAN message check that a CAN message has not been received from the communications bus, the diagnostic step comprises determining whether a CAN error has been received.

34. The data link tester of claim 33, wherein the CAN error is selected from the group consisting of a stuffing error, a form error, and a cyclic redundancy check (CRC) error.

35. The data link tester of claim 27, wherein the equipment comprises a vehicle.

36. The data link tester of claim 27, wherein the computer is on board the piece of equipment.

37. The data link tester of claim 27, further comprising a user interface.

38. The data link tester of claim 27, wherein the computer is a component controller.

39. The data link tester of claim 27, wherein the connection comprises a cable that supports the RS-232 data communications standard.

40. A method comprising:
   connecting a computer with a communications bus in a piece of equipment, wherein the piece of equipment comprises at least one component of interest in selective contact with the communications bus;
   building a roster comprising at least one identifier of the component; and
   performing a first diagnostic step comprising at least one of (i) analyzing communications received from the communications bus to determine the condition of communications with respect to the component, (ii) determining whether a message that contains the identifier has been received from the communications bus within a specified period of time, and (iii) diagnosing at least one fault condition in CAN communications in the communications bus by performing at least one CAN message check comprising determining whether a CAN message has been received from the communications bus and then performing at least one second diagnostic step;
   wherein the first diagnostic step further comprises determining a number of messages received per second relating to the identifier.

41. The method of claim 40, wherein the computer is a component controller.

42. The method of claim 40, further comprising performing the at least one CAN message check a plurality of times; and
   the diagnostic step comprises one of (a) determining whether a specified time exceeds an elapsed period of time between performance of a first CAN message check in, which a CAN message was detected containing data and a second CAN message check in which a CAN message was detected not containing data, and (b) determining whether a specified period of time exceeds an elapsed period of time between performance of a first CAN message check in which a CAN message was detected containing data and a second CAN message check in which a CAN message was detected containing data.

43. The method of claim 40, wherein the diagnostic step comprises determining whether a link open condition exists.

44. The method of claim 40, wherein the diagnostic step comprises determining whether a link shorted condition exists by one of (a) determining whether the communications bus has been sending only ones for the specified period of time and (b) determining whether the communications bus has been sending only zeroes for the specified period of time.

* * * * *

UNITED STATES PATENT AND TRADEMARK OFFICE
CERTIFICATE OF CORRECTION

PATENT NO. : 7,124,051 B2  
APPLICATION NO. : 10/767812  
DATED : October 17, 2006  
INVENTOR(S) : Jack D. Patterson et al.

It is certified that error appears in the above-identified patent and that said Letters Patent is hereby corrected as shown below:

Col. 16, Line 28 "tat" should be --that--.

Col. 18, Line 20 please delete "," after "check in".

Signed and Sealed this

Sixth Day of March, 2007

JON W. DUDAS  
*Director of the United States Patent and Trademark Office*